(12) United States Patent
Horng

(10) Patent No.: US 10,644,553 B2
(45) Date of Patent: May 5, 2020

(54) SILICON STEEL PLATE OF THE OUTER-ROTOR MOTOR

(71) Applicant: Sunonwealth Electric Machine Industry Co., Ltd., Kaohsiung (TW)

(72) Inventor: Alex Horng, Kaohsiung (TW)

(73) Assignee: SUNONWEALTH ELECTRIC MACHINE INDUSTRY CO., LTD., Kaohsiung (TW)

( * ) Notice: Subject to any disclaimer, the term of this patent is extended or adjusted under 35 U.S.C. 154(b) by 332 days.

(21) Appl. No.: 15/632,424

(22) Filed: Jun. 26, 2017

(65) Prior Publication Data

US 2018/0062465 A1 Mar. 1, 2018

(30) Foreign Application Priority Data

Sep. 1, 2016 (TW) ................................ 105128292

(51) Int. Cl.
| | | |
|---|---|---|
| *H02K 1/27* | (2006.01) | |
| *H02K 1/14* | (2006.01) | |
| *H02K 1/18* | (2006.01) | |
| *H02K 7/00* | (2006.01) | |
| *H02K 1/22* | (2006.01) | |
| *H02K 1/08* | (2006.01) | |
| *H02K 1/28* | (2006.01) | |

(52) U.S. Cl.
CPC ........... *H02K 1/2786* (2013.01); *H02K 1/146* (2013.01); *H02K 1/187* (2013.01); *H02K 7/003* (2013.01); *H02K 1/28* (2013.01); *H02K 2213/03* (2013.01)

(58) Field of Classification Search
CPC ........ H02K 1/2786; H02K 1/14; H02K 1/146; H02K 1/28; H02K 7/003
See application file for complete search history.

(56) References Cited

U.S. PATENT DOCUMENTS

| 3,882,336 A | * | 5/1975 | Boyd | .................... H02K 1/26 |
| | | | | 310/216.115 |
| 4,053,801 A | * | 10/1977 | Ray | ..................... H02K 1/26 |
| | | | | 310/216.017 |
| 4,719,382 A | * | 1/1988 | Listing | ................. H02K 23/42 |
| | | | | 310/177 |
| 4,859,895 A | * | 8/1989 | Morishita | ............ H02K 1/265 |
| | | | | 310/216.069 |

(Continued)

FOREIGN PATENT DOCUMENTS

| CN | 204168016 U | 2/2015 |
| TW | 534529 U | 5/2003 |

*Primary Examiner* — Edgardo San Martin
(74) *Attorney, Agent, or Firm* — Alan D. Kamrath; Karin L. Williams; Mayer & Williams PC

(57) ABSTRACT

A silicon steel plate of a stator of an outer-rotor motor includes a magnetic yoke ring, a plurality of magnetic poles and a plurality of pole pieces is disclosed. The magnetic yoke ring has an inner edge and an outer edge. The inner edge forms a shaft hole. Each of the plurality of magnetic poles includes an inner end connected to the outer edge of the magnetic yoke ring. The plurality of magnetic poles is arranged around the magnetic yoke ring in even angles. Each of the plurality of pole pieces is connected to an outer end of a respective one of the plurality of magnetic poles. The silicon steel plate has a maximal diameter denoted as "W," and the shaft hole has a diameter denoted as "D," wherein $0.12 \leq D/W \leq 0.4$.

10 Claims, 4 Drawing Sheets

(56) References Cited

U.S. PATENT DOCUMENTS

| | | | | |
|---|---|---|---|---|
| 5,045,742 | A | * | 9/1991 | Armstrong ............ H02K 1/146 |
| | | | | 310/216.013 |
| 7,759,829 | B2 | * | 7/2010 | Holter ...................... H02K 1/32 |
| | | | | 310/216.121 |
| 9,157,424 | B2 | * | 10/2015 | Smith ................... H02K 23/40 |
| 9,929,607 | B2 | * | 3/2018 | Kataoka ............. F04B 39/0238 |
| 10,243,439 | B2 | * | 3/2019 | Li .......................... H02K 1/146 |
| 10,326,323 | B2 | * | 6/2019 | Bhargava ................ D06F 37/30 |
| 2016/0329762 | A1 | * | 11/2016 | Li ........................ H02K 1/2786 |
| 2018/0159385 | A1 | * | 6/2018 | Horng ...................... H02K 1/02 |

* cited by examiner

US 10,644,553 B2

SILICON STEEL PLATE OF THE OUTER-ROTOR MOTOR

CROSS REFERENCE TO RELATED APPLICATIONS

The application claims the benefit of Taiwan application serial No. 105128292, filed on Sep. 1, 2016, and the subject matter of which is incorporated herein by reference.

BACKGROUND OF THE INVENTION

1. Field of the Invention

The present disclosure generally relates to a motor component and, more particularly, to a silicon steel plate of a stator of an outer-rotor motor.

2. Description of the Related Art

FIG. 1 shows a conventional silicon plate unit forming a stator of an outer-rotor motor. The conventional silicon plate unit includes a plurality of silicon steel plates 9. Each silicon steel plate 9 forms a shaft hole 91 at the center thereof. The silicon steel plate 9 can be fitted around a shaft tube (not shown) of a motor base through the shaft hole 91. The silicon plate unit forms six magnetic poles 92 arranged around the shaft hole 91 in even angles. A plurality of coils C can be arranged on the magnetic poles 92. A pole piece 93 is arranged at the outer end of each magnetic pole 92 to increase the magnetically conductive area of the magnetic pole 92. An embodiment of such a conventional silicon plate unit is seen in Taiwan Patent No. 534529.

For the stator of an outer-rotor motor, the numbers of turns of the coils C can directly affect the torque of the motor. However, the number of turns of the coil C is limited by the length of the magnetic pole 92. Namely, the longer the magnetic pole 92 the larger the number of turns of the coil C. Therefore, if it is desired to increase the number of turns of the coil C to increase the torque of the motor, the most efficient way is to lengthen the magnetic pole 92 of the silicon steel plate 9.

However, under a constant diameter of the shaft hole 91, increasing the lengths of the magnetic poles 92 of the silicon steel plate 9 will increase the size and weight of the silicon steel plate 9. Therefore, the silicon steel plate 9 cannot be used in an occasion where a lightweight motor with a high torque is required, such as in a camera drone. In particular, since the air camera has a very limited space for the motor, it would be an important subject among the motor manufacturers to produce a motor with a reduced weight and an increased torque without increasing the stator size of the motor.

Based on the above structure, if the maximal diameter W of the silicon steel plate 9 remains unchanged, the size of the shaft hole 91 can be reduced to increase the lengths of the magnetic poles 92. However, if the shaft hole 91 is too small, the coupling strength between the silicon steel plate 9 and the shaft tube of the motor base is not strong enough. The coupling strength is particularly important and cannot be compromised when the motor is used in an occasion where the motor base tends to shake intensively during the normal operation, such as in an air camera. As such, the designer would have to face the difficult situation when it comes to determining the sizes between the shaft hole 91 and the magnetic pole 92, rendering a need to improve the silicon steel plates 9.

SUMMARY OF THE INVENTION

It is therefore the objective of this disclosure to provide a silicon steel plate used to construct a stator of an outer-rotor motor. The silicon steel plate can provide a maximal winding space to increase the torque of the motor while ensuring a secure coupling effect between the silicon steel plate and the shaft tube.

In an embodiment, a silicon steel plate of a stator of an outer-rotor motor including a magnetic yoke ring, a plurality of magnetic poles and a plurality of pole pieces is disclosed. The magnetic yoke ring has an inner edge and an outer edge. The inner edge forms a shaft hole. Each of the plurality of magnetic poles includes an inner end connected to the outer edge of the magnetic yoke ring. The plurality of magnetic poles is arranged around the magnetic yoke ring in even angles. Each of the plurality of pole pieces is connected to an outer end of a respective one of the plurality of magnetic poles. The silicon steel plate has a maximal diameter denoted as "W," and the shaft hole has a diameter denoted as "D," wherein $0.12 \leq D/W \leq 0.4$.

As such, the silicon steel plate of the embodiment of the disclosure is able to increase the torque of the motor by providing a larger winding space without changing the maximal diameter of the shaft hole. This also ensures that the shaft hole has a proper value to provide a secure coupling effect between the shaft tube and the silicon steel plate. As such, the motor can still operate smoothly in a machine which constantly shakes during its normal operation. Furthermore, based on the above equation, the designer is able to quickly and correctly determine the minimal size of the shaft hole with which the shaft tube can be securely coupled. Thus, the time of product design can be shortened and the effort in designing the product can be reduced.

In a form shown, the maximal diameter "W" is 15 mm to 65 mm.

In the form shown, the magnetic yoke ring forms at least one engaging notch at the inner edge thereof. This structure can increase the assembly efficiency and accuracy.

In the form shown, a quantity of the plurality of magnetic poles is three or a multiple of three. The quantity of the plurality of magnetic poles is preferably twelve.

In the form shown, a width between the inner edge and the outer edge of the magnetic yoke ring is set as a value larger than or equal to a half of a width of each of the plurality of magnetic poles. This structure can enhance the structural strength of the silicon steel plate.

BRIEF DESCRIPTION OF THE DRAWINGS

The present disclosure will become more fully understood from the detailed description given hereinafter and the accompanying drawings which are given by way of illustration only, and thus are not limitative of the present disclosure, and wherein.

Figure 1:
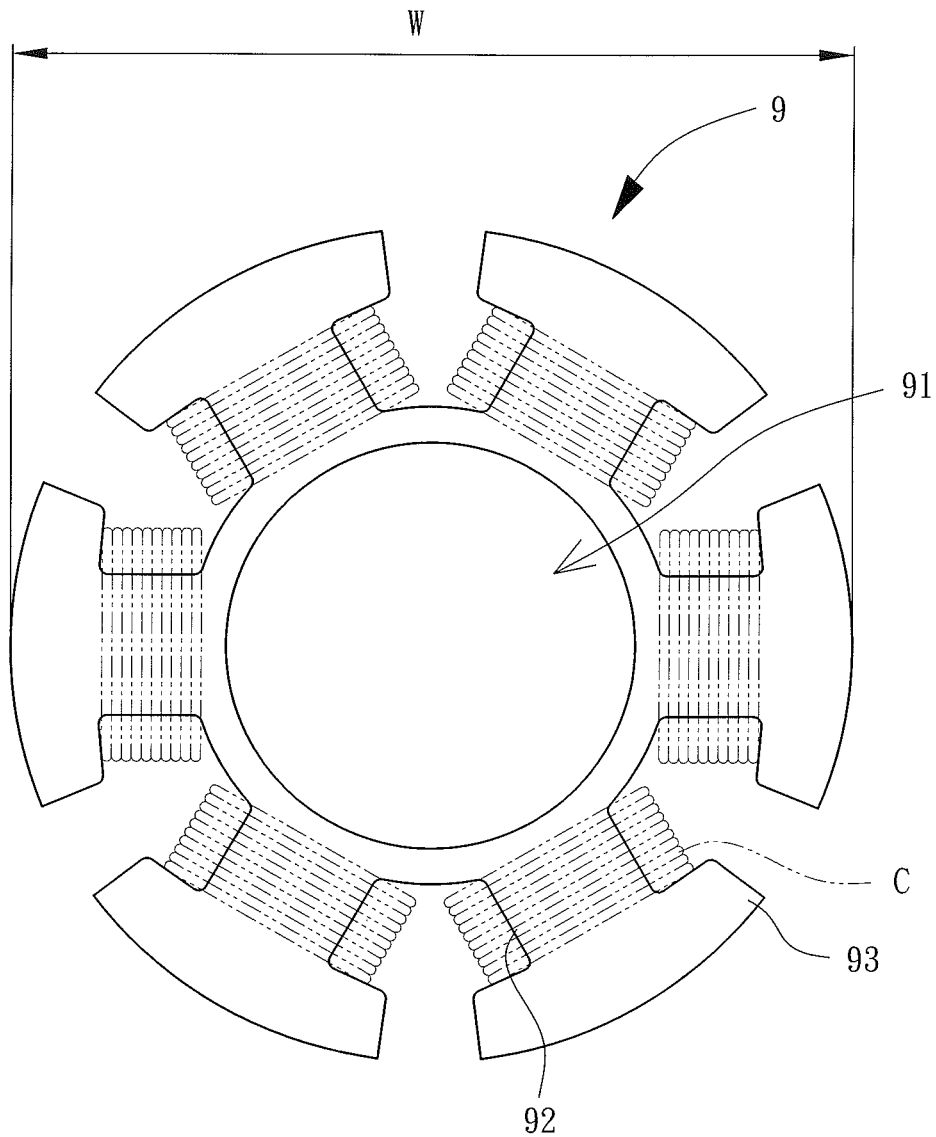
FIG. 1 is a plan view of a conventional silicon steel plate of a stator of an outer-rotor motor.

In the various figures of the drawings, the same numerals designate the same or similar parts. Furthermore, when the terms "inner", "outer" and similar terms are used hereinafter, it should be understood that these terms have reference only to the structure shown in the drawings as it would appear to a person viewing the drawings, and are utilized only to facilitate describing the disclosure.

DETAILED DESCRIPTION OF THE INVENTION

Figure 2:
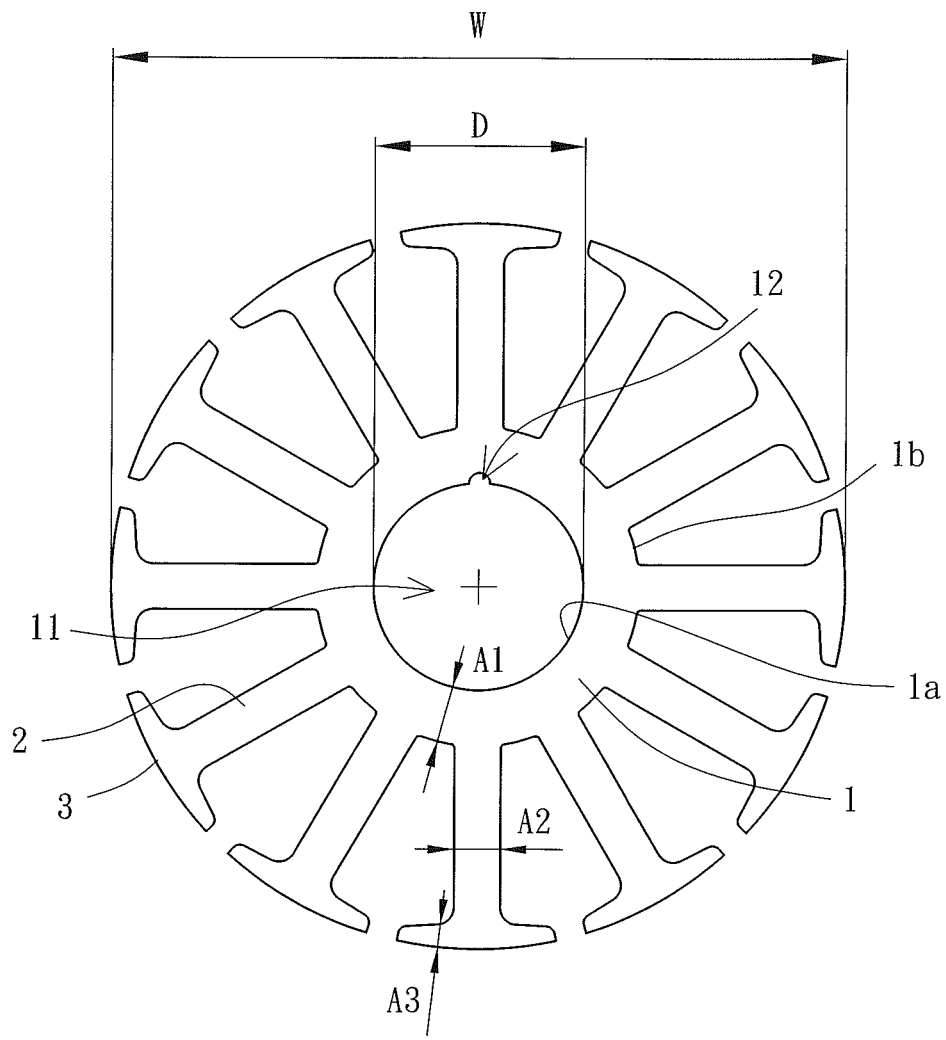
FIG. 2 is a plan view of a silicon steel plate according to an embodiment of the disclosure.

FIG. 2 shows a silicon steel plate used to construct a stator of an outer-rotor motor according to an embodiment of the disclosure. The silicon steel plate includes a magnetic yoke ring 1, a plurality of magnetic poles 2 and a plurality of pole pieces 3. The magnetic poles 2 are connected to the outer edge of the magnetic yoke ring 1. Each of the pole pieces 3 is connected to the outer end of a respective magnetic pole 2.

Figure 3:
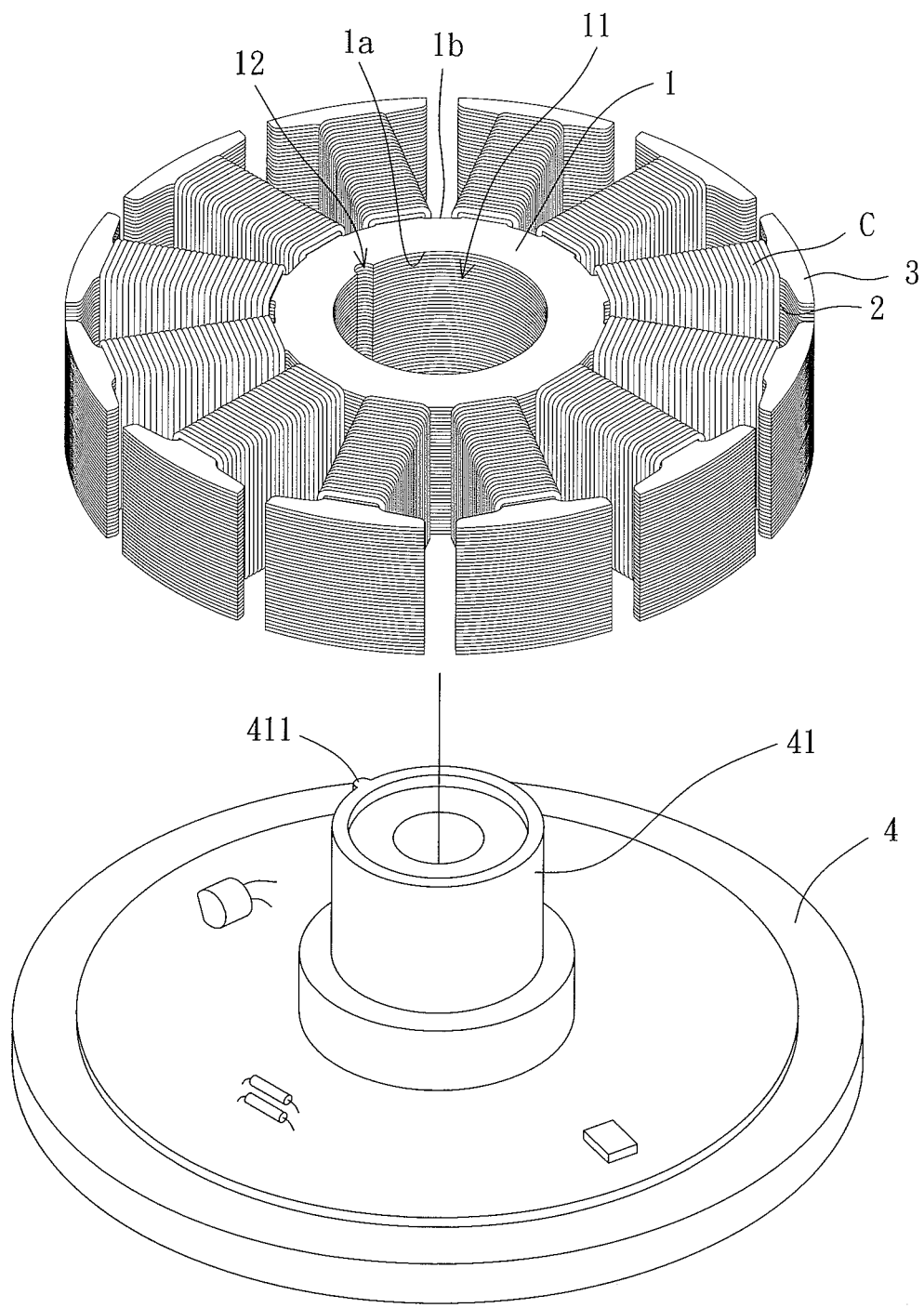
FIG. 3 shows a motor base of an outer-rotor motor and a stator of the motor formed by a silicon steel plate unit having a plurality of the silicon steel plates of the embodiment of the disclosure.

Referring to FIGS. 2 and 3, the magnetic yoke ring 1 includes an inner edge 1a and an outer edge 1b. The inner edge 1a forms a shaft hole 11 having a diameter D. The silicon steel plate of the embodiment of the disclosure can be fitted around a shaft tube 41 of a motor base 4 via the shaft hole 11. The inner edge 1a of the magnetic yoke ring 1 may form at least one engaging notch 12 with which at least one protrusion 411 of the shaft tube 41 can be aligned. Through the arrangement of the shaft tube 41, efficient and precise assembly can be attained. Under the arrangement of the engaging notch 12, the diameter D is the maximal diameter of the shaft hole 11 not including the engaging notch 12.

The quantity of the magnetic poles 2 can be three or a multiple of three, and is preferably twelve. The magnetic poles 2 are arranged around the magnetic yoke ring 1 in even angles. Each of the magnetic poles 2 includes an inner end connected to the outer edge 1b of the magnetic yoke ring 1. When a plurality of silicon steel plates of the embodiment of the disclosure is stacked together, the silicon steel plates may align with each other for winding purpose of the coil C. As such, the stator of a three-phased brushless direct current outer-rotor motor can be formed.

The quantity of the pole pieces 3 is the same as that of the magnetic poles 2. Each of the pole pieces 3 is connected to the outer end of a respective magnetic pole 2, so that the pole piece 3 can provide a larger magnetically conductive area while preventing the coil C from extending beyond where the magnetic pole 2 is connected to the pole piece 3.

The magnetic yoke ring 1, the magnetic pole 2 and the pole piece 3 may be integrally formed with each other, or can be combined with each other via some mechanical structures.

Furthermore, the silicon steel plate has a maximal diameter W. The relation between the maximal diameter W and the diameter D can be represented by the following equation: $0.12 \leq D/W \leq 0.4$. The maximal diameter W is preferably 15 mm-65 mm.

Based on this, the maximal diameter W of the silicon steel plate can be determined as long as the available motor space is given. Then, the diameter D of the shaft hole 11 can be easily calculated through the above equation. This ensures that the silicon steel plate can be securely coupled with the shaft tube 41 and increases the winding space of the silicon steel plate. Thus, the silicon steel plate can provide a larger torque among all kinds of silicon steel plates having the same maximal diameter.

In the embodiment, a width A1 between the inner edge 1a and the outer edge 1b of the magnetic yoke ring 1 can be set as a value larger than or equal to a half of a width A2 of the magnetic pole 2. As such, the magnetic yoke ring 1 can have a sufficient structural strength to support the magnetic poles 2 and the coils C without deformation. In addition, the pole piece 3 has a width A3 in a radial direction of the shaft hole 11. If the connected part between the magnetic pole 2 and the pole piece 3 presents a right angle, the width A3 is the distance between the outer face of the pole piece 3 and said connected part in a radial direction. If the connected part between the magnetic pole 2 and the pole piece 3 presents a curved pattern, the width A3 is the distance between the end of the curve, which is adjacent to the pole piece 3, and said connected part in a radial direction. The width A3 is about 0.1-0.7 times of the width A2 of the magnetic pole 2 in order to provide a larger winding space of the silicon steel plate.

Figure 4:
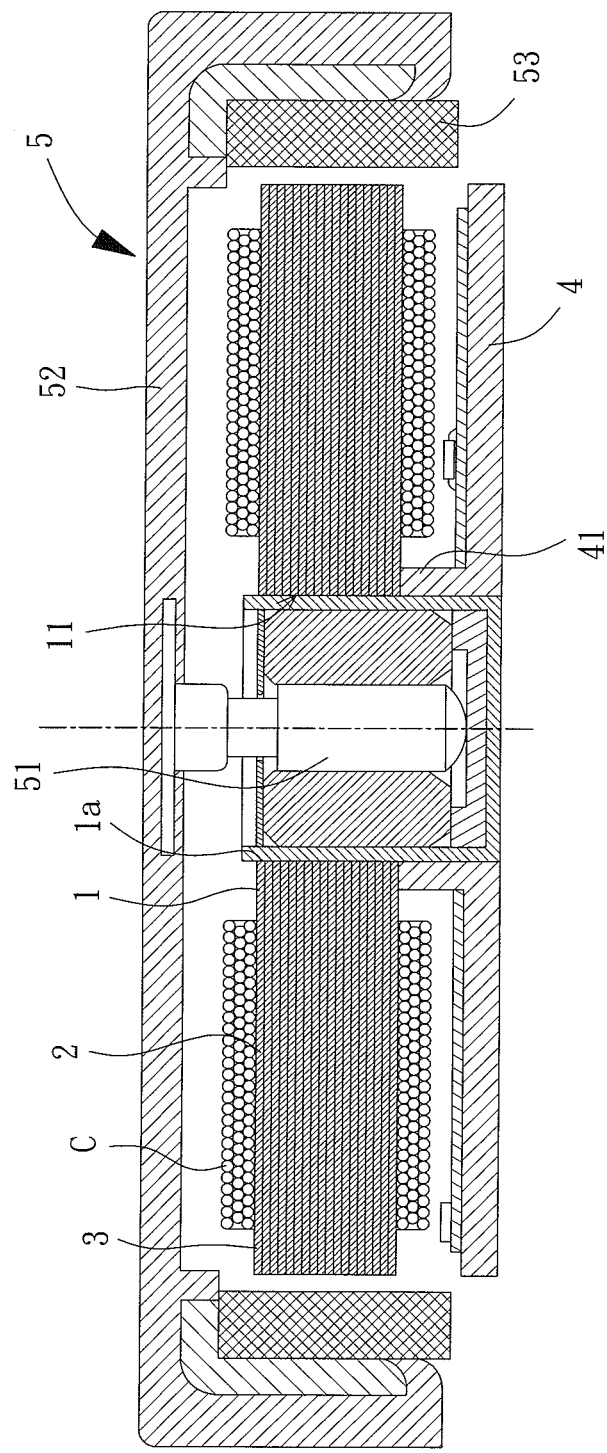
FIG. 4 is a cross sectional view of the outer-rotor motor using the plurality of the silicon steel plates of the embodiment of the disclosure.

Referring to FIGS. 3 and 4, based on the above structure, a plurality of such silicon steel plates can form a silicon steel plate unit. The silicon steel plate unit can be fitted around the shaft tube 41 of the motor base 4 via the shaft hole 11. In this regard, a shaft 51 of a rotor 5 can be rotatably received in the shaft tube 41. The shaft 51 is connected to a hub 52 having a permanent magnet 53 mounted to an inner face of the hub 52. The permanent magnet 53 faces the pole pieces 3 of the silicon steel plates. As such, when the coils C of the stator of the motor are electrified, the silicon steel plates can generate a magnetic force repelling the permanent magnet 53 of the rotor 5. Consequently, the repelling force drives the shaft 51 and the hub 52 to rotate under the repelling force.

In summary, the silicon steel plate of the embodiment of the disclosure is able to provide a larger winding space through the reduction in the size of the shaft hole without changing the maximal diameter of the silicon steel plate, thereby increasing the torque of the motor. At the same time, the size of the shaft hole can be designed in a proper value to provide a secure coupling effect between the shaft tube and the silicon steel plate. As such, the motor can still operate smoothly in a machine which constantly shakes during its normal operation. Furthermore, based on the above equation, the designer is able to quickly and correctly determine the minimal size of the shaft hole with which the shaft tube can be securely coupled while ensuring a maximal winding space. Thus, the time of product design can be shortened and the effort in designing the product can be reduced.

Although the disclosure has been described in detail with reference to its presently preferable embodiments, it will be understood by one of ordinary skill in the art that various modifications can be made without departing from the spirit and the scope of the disclosure, as set forth in the appended claims.

What is claimed is:

1. A silicon steel plate of a stator of an outer-rotor motor, comprising:
   a magnetic yoke ring having an inner edge and an outer edge, wherein the inner edge forms a shaft hole;
   a plurality of magnetic poles, wherein each of the plurality of magnetic poles comprises an inner end connected to the outer edge of the magnetic yoke ring, wherein the plurality of magnetic poles is arranged around the magnetic yoke ring in even angles; and
   a plurality of pole pieces, wherein each of the plurality of pole pieces is connected to an outer end of a respective one of the plurality of magnetic poles,
   wherein the silicon steel plate has a maximal diameter denoted as "W," and the shaft hole has a diameter denoted as "D," wherein $0.12 \leq D/W \leq 0.4$.

2. The silicon steel plate of the stator of the outer-rotor motor as claimed in claim 1, wherein the maximal diameter "W" is 15 mm to 65 mm.

3. The silicon steel plate of the stator of the outer-rotor motor as claimed in claim 1, wherein the magnetic yoke ring forms at least one engaging notch at the inner edge thereof.

4. The silicon steel plate of the stator of the outer-rotor motor as claimed in claim 1, wherein a quantity of the plurality of magnetic poles is three or a multiple of three.

5. The silicon steel plate of the stator of the outer-rotor motor as claimed in claim 4, wherein the quantity of the plurality of magnetic poles is twelve.

6. The silicon steel plate of the stator of the outer-rotor motor as claimed in claim 1, wherein a width between the inner edge and the outer edge of the magnetic yoke ring is set as a value larger than or equal to a half of a width of each of the plurality of magnetic poles.

7. The silicon steel plate of the stator of the outer-rotor motor as claimed in claim 2, wherein a width between the inner edge and the outer edge of the magnetic yoke ring is set as a value larger than or equal to a half of a width of each of the plurality of magnetic poles.

8. The silicon steel plate of the stator of the outer-rotor motor as claimed in claim 3, wherein a width between the inner edge and the outer edge of the magnetic yoke ring is set as a value larger than or equal to a half of a width of each of the plurality of magnetic poles.

9. The silicon steel plate of the stator of the outer-rotor motor as claimed in claim 4, wherein a width between the inner edge and the outer edge of the magnetic yoke ring is set as a value larger than or equal to a half of a width of each of the plurality of magnetic poles.

10. The silicon steel plate of the stator of the outer-rotor motor as claimed in claim 5, wherein a width between the inner edge and the outer edge of the magnetic yoke ring is set as a value larger than or equal to a half of a width of each of the plurality of magnetic poles.

* * * * *